(12) United States Patent
Shah et al.

(10) Patent No.: US 6,175,879 B1
(45) Date of Patent: Jan. 16, 2001

(54) METHOD AND SYSTEM FOR MIGRATING CONNECTIONS BETWEEN RECEIVE-ANY AND RECEIVE-DIRECT THREADS

(75) Inventors: Bharat Shah, New Castle; Mario C. Goertzel, Kirkland; Mazhar N. Mohammed, Bellevue, all of WA (US)

(73) Assignee: Microsoft Corporation, Redmond, WA (US)

(*) Notice: Under 35 U.S.C. 154(b), the term of this patent shall be extended for 0 days.

(21) Appl. No.: 08/790,632

(22) Filed: Jan. 29, 1997

(51) Int. Cl.[7] ........................................................ G06F 9/00
(52) U.S. Cl. ............................................................. 709/330
(58) Field of Search .......................... 709/304, 100–108, 709/330, 223, 310–332, 204

(56) References Cited

U.S. PATENT DOCUMENTS

| 5,247,676 | * | 9/1993 | Ozur et al. ............................ 709/304 |
| 5,307,490 | * | 4/1994 | Davidson et al. ..................... 709/304 |
| 5,430,876 | * | 7/1995 | Schreiber et al. ..................... 709/304 |
| 5,745,778 | * | 4/1998 | Alfieri .................................... 712/1 |
| 5,774,668 | * | 6/1998 | Choquier et al. ..................... 709/223 |
| 5,822,525 | * | 10/1998 | Tafoya et al. ......................... 709/204 |

* cited by examiner

Primary Examiner—Alvin E. Oberley
Assistant Examiner—St. John Courtenay, III
(74) Attorney, Agent, or Firm—Michalik & Wylie, PLLC

(57) ABSTRACT

A method and mechanism for efficiently handling connections in a computer system between client sockets and data sockets of a server. The server includes a receive-any thread having a socket mask associated therewith to listen for new connection requests and for activity on data sockets handled thereby. The server further includes receive-direct threads associated with at least some of the data sockets for handling data communication. When a receive-direct connection has no activity for a period of time, the connection is migrated to a receive-any connection. When a receive-any connection becomes active, the connection is migrated to a receive-direct connection if a receive-direct thread is available.

50 Claims, 6 Drawing Sheets

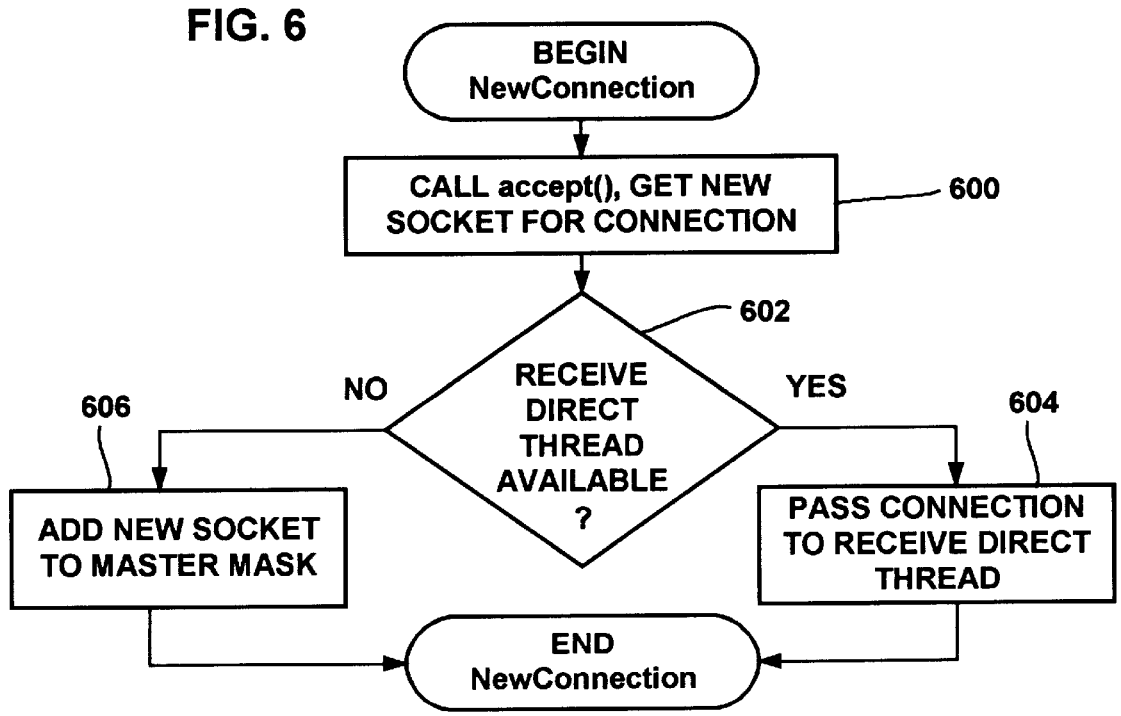
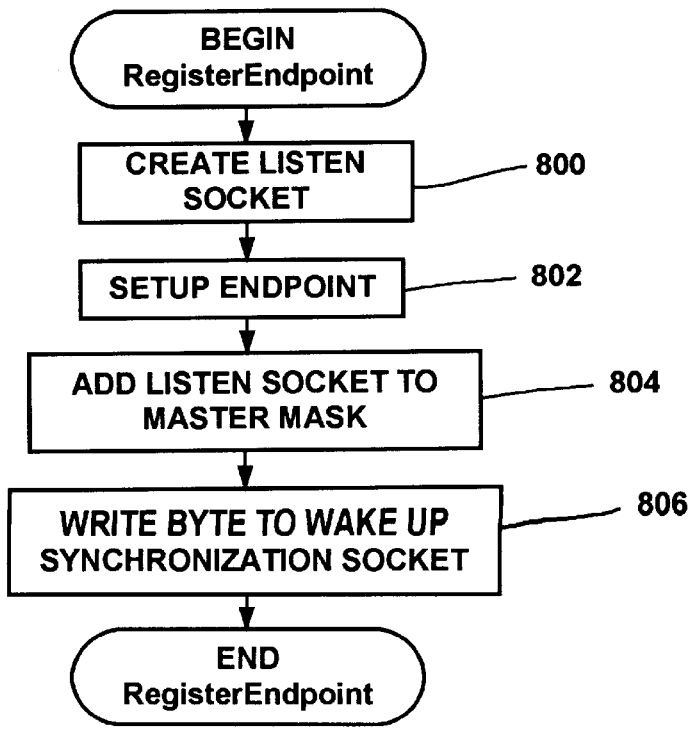

METHOD AND SYSTEM FOR MIGRATING CONNECTIONS BETWEEN RECEIVE-ANY AND RECEIVE-DIRECT THREADS

FIELD OF THE INVENTION

The invention relates generally to computer networks, and more particularly to an improved method and mechanism for handling network connections with threads.

BACKGROUND OF THE INVENTION

A receive-any thread is a thread of execution in a server process that handles both requests for new connections and incoming remote procedure call (RPC) requests on (one or more) existing connections, if any. The receive-any thread responds to a new connection request by posting an accept, and to an RPC data request by posting a receive. Receive-any threads accomplish this dual-functionality using a Windows® Sockets API (WinSock) call such as selects( ) to block, listening for new connection requests and activity on existing connections. Other environments use similar APIs. Since RPC servers typically listen on more than one protocol (e.g., TCP, SPX or ADSP) at any given time, one receive-any thread is provided to deal with each protocol.

However, because receive-any threads multiplex between requests for new connections and receiving RPC data, perform parameter validation and do extra data copying (buffering), they are relatively slow. More particularly, when receiving data via a receive-any thread, the cost of the select and the extra copying cost of transferring data from the transport buffers to the RPC runtime add substantial runtime overhead. As a result, another type of thread known as a receive-direct thread may be used for an existing data connection.

A receive-direct thread is a dedicated thread which receives RPC requests on a specific connection and dispatches those requests. A receive-direct thread pre-posts a receive on the connection to avoid the data copying and the overhead associated with select( ), i.e., using the WinSock recv( ) API, a receive-direct thread receives data into application buffers as the data arrives. Receive-direct threads thus have less runtime overhead and provide better performance when handling data than do receive-any threads. Indeed, in certain instances, the use of a receive-direct thread provides at least a twenty percent performance improvement over a receive-any thread.

However, each receive-direct thread has costs associated therewith including an increased memory size and footprint. With the above scheme of making existing data connections receive-direct connections, many receive-direct threads, up to some predetermined quota, may be allocated in memory. If a connection is idle or mostly idle, the receive-direct thread associated therewith is also idle and system resources are wasted. Moreover, a receive-direct thread may not be available for a newer, highly active connection because other for a newer, highly active connections because other connections, including idle connections, have used up the quota of receive-direct threads. The highly active connection instead has to remain receive-any, and thus suffers from the reduced performance associated with receive-any data handling.

OBJECTS AND SUMMARY OF THE INVENTION

Accordingly, it is a general object of the present invention to provide a method and mechanism for more efficiently using receive-any and receive-direct threads for handling connections.

Another object is to provide a method and mechanism of the above kind that adjusts thread usage for idle or active connections.

A related object is to provide a method and mechanism as characterized above that migrates connections between receive-any and receive-direct based upon connection activity.

In accomplishing those objects, it is another object of the invention to provide a common receive-any thread that listens on multiple protocols.

Briefly, the present invention provides a method and mechanism for handling a connection in a computer system between a client socket and a data socket of a server. The server includes a receive-direct thread associated with the data socket for handling communication on the connection, and a receive-any thread with a socket mask associated therewith. When the connection has no activity for a period of time, information referencing the data socket associated with the receive-direct thread is moved to the socket mask associated with the receive-any thread, whereby the (idle) connection becomes a receive-any connection. A receive-any connection that becomes active is migrated to a receive-direct thread, when one is available.

Other objects and advantages will become apparent from the following detailed description when taken in conjunction with the drawings, in which:

BRIEF DESCRIPTION OF THE DRAWINGS

FIG. 6 is a flow diagram representing the general steps taken to make a new connection;

FIG. 8 is a flow diagram representing the general steps taken in registering a new endpoint.

DETAILED DESCRIPTION OF THE PREFERRED EMBODIMENT

Figure 1:
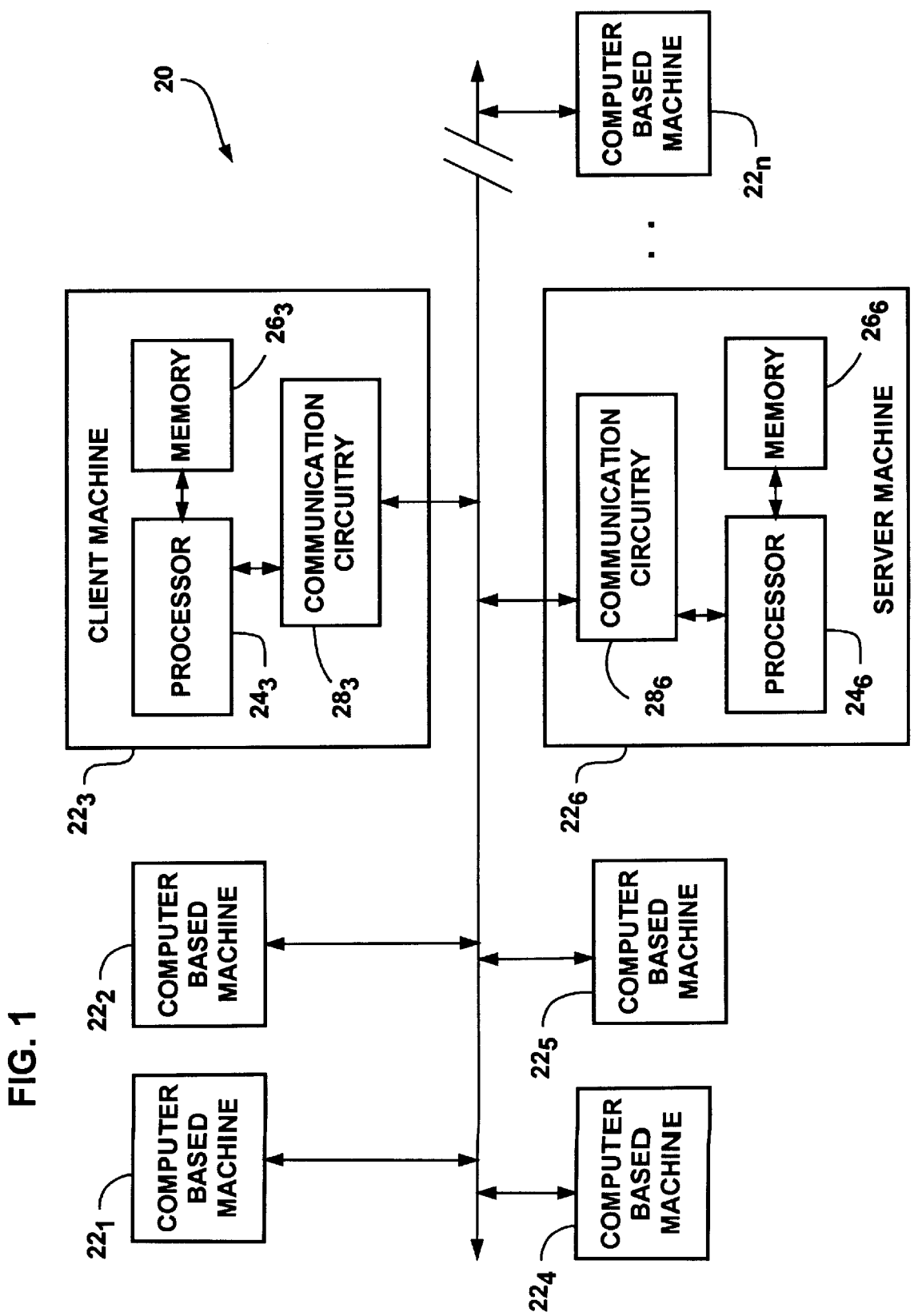
FIG. 1 is a block diagram representing a computer network into which the present invention may be incorporated.

Turning to the drawings and referring first to FIG. 1, there is shown a computer network generally designated 20 into which the present invention may be incorporated. The computer network 20 comprises a number of computer-based machines $22_1$–$22_n$ such as personal computers interconnected in known manner. The machines $22_1$–$22_n$ communicate with one another via remote procedure calls by passing data packets. Each of the machines $22_1$–$22_n$ may be configured to recognize many different protocols at the network and transport layers. In FIG. 1, the machine $22_3$ is shown as a client machine and the machine $22_6$ is shown as a server machine, although it can be appreciated that in a particular network many of the machines act as both servers and clients. Of course, certain of the machines may be limited so as to act only as clients or only as servers.

Each of the machines such as the machines $22_3$ and $22_6$ of FIG. 1 includes a processor 24, a memory 26, and network communication circuitry 28 that enables the machines to communicate with one another. The memory 26 includes random access memory and/or non-volatile storage, which, as understood, can together comprise a large amount of virtual memory via swapping techniques. The memory 26 may contain instantiated objects and persistent data for other objects as understood in object-oriented technology, as well as WinSock functions (e.g., in the dynamic link library wsock32.dll) as described below.

Figure 2:
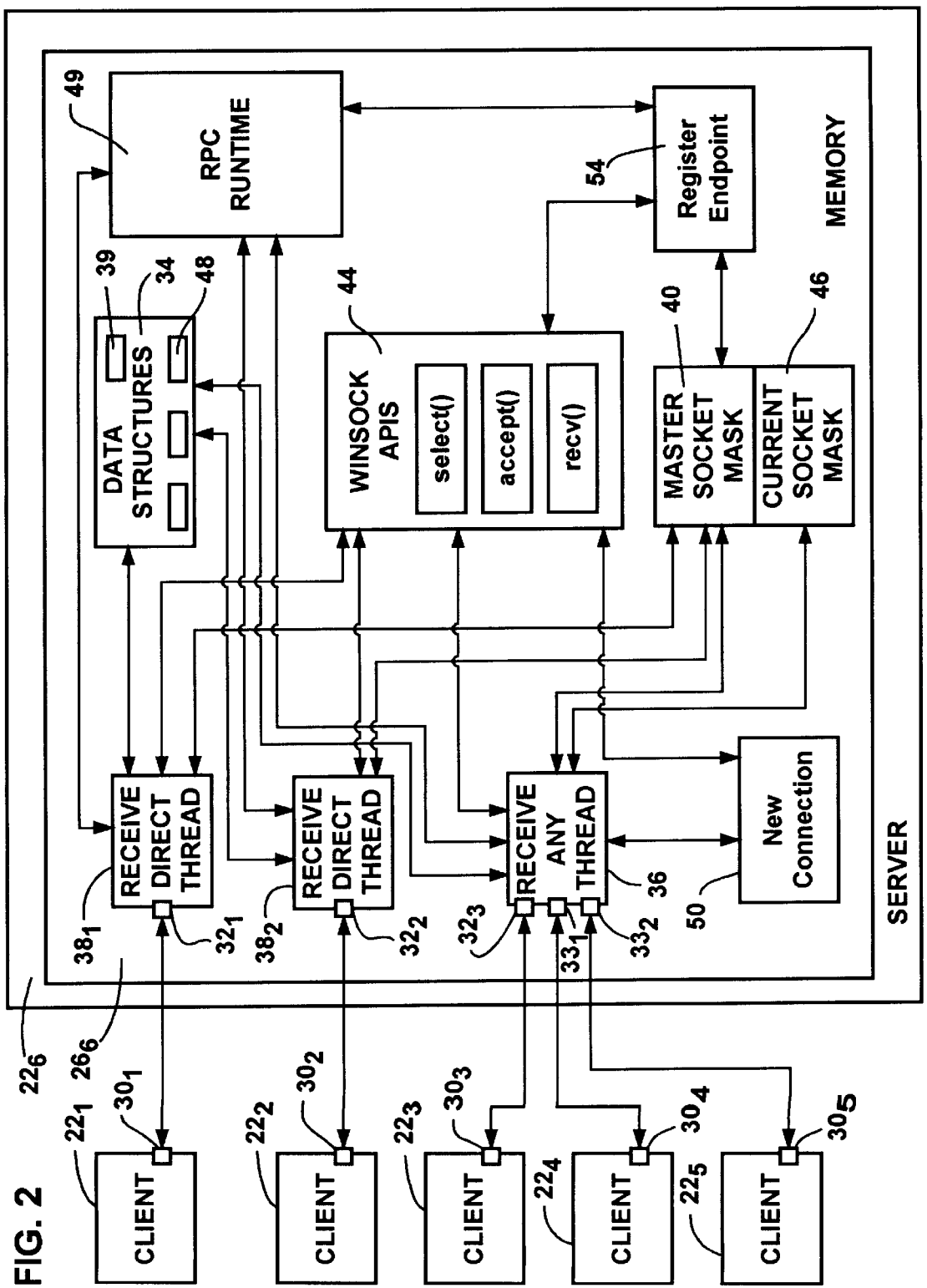
FIG. 2 is a block diagram representing components in a server machine logically connected to one another and to client processes.

FIG. 2 shows the virtual connections between a number of clients $22_1$–$22_5$ (more particularly client processes) and the server $22_6$. For simplicity, FIG. 2 shows each virtual connection to the server $22_6$ as coming from a separate client machine $22_1$–$22_5$, although it is understood that a single client machine may have multiple connections to a server. As is known, each of the clients $22_1$–$22_5$ communicate with the server $22_6$ through a virtual connection between a client socket $30_1$–$30_5$ and an associated server socket $32_1$-$32_3$ and $33_1$-$33_2$. The server 226 maintains information about each of its sockets $32_1$-$32_3$ and $33_1$-$33_2$ within a set of data structures 34, typically a connection object for each socket. For example, such socket information includes a socket ID, which in TCP (Transmission Control Protocol) comprises a protocol identifier, a server IP (Internet Protocol) address and a server endpoint (port number). Each of the data structures 34 representing a TCP socket includes a field to store this socket ID, along with other fields and flags.

A connection may be in one of four states, i.e., a new connection, an existing receive-any connection, an existing receive-direct connection, or a closed connection. New connections and existing receive-any connections are handled by a receive-any thread 36, through listening sockets 33 and data sockets 32, respectively. For example, in FIG. 2 the socket $30_3$ of client $22_3$ may be connected to the server data socket $32_3$, while the clients $22_4$ and $22_5$ are each requesting a new connection via server listening sockets $33_1$ and $33_2$, respectively. In accordance with one aspect of the invention, the receive-any thread 36 listens for new connections and handles data on different protocols, as described in more detail below. For this reason, the receive-any thread 36 of the present invention is alternatively referred to as a common listening thread.

Each existing receive-direct connection is handled by a dedicated receive-direct thread. FIG. 2 shows two receive-direct threads, $38_1$ and $38_2$, which connect via server data sockets $32_1$ and $32_2$ to client sockets $30_1$ and $30_2$, respectively. Finally, closed connections are detected and handled by whichever type of thread (receive-any or receive-direct) was handling the connection before it was closed.

A client thus establishes a new connection via the server receive-any thread 36 through a listening socket (e.g., socket $33_1$ or $33_2$) of an appropriate protocol. In keeping with the invention, when a new connection is established, if a receive-direct thread is available, a receive-direct thread $38_n$ will be allocated and the connection will be made a receive-direct connection. A counter (object) 39 or the like is maintained in the server memory $26_6$ such as one of the data structures 34 to determine if a receive-direct thread is available based on a quota. If a receive-direct thread is not available, the connection will be handled by the receive-any thread 36, i.e., the connection is made a receive-any connection.

To keep track of the various listening sockets $33_1$–$33_n$ and data sockets $32_1$–$32_n$ under the control of the common listening thread 36, the common listening thread 36 maintains pointers to the sockets'data structures in an array known as a socket mask 40. The socket mask 40 is represented in more detail in FIG. 3, with a set of listening sockets 33 and data sockets 32, wherein each letter A, B or C represents a different protocol. The socket mask also includes a synchronization socket 42 (FIG. 3), described in more detail below.

In accordance with one aspect of the present invention, if a receive-direct connection is idle for a sufficient period of time, the connection is migrated to a receive-any connection. The receive-direct thread (e.g., $38_1$) performs this task and essentially frees itself for possible use by a more active connection. To this end, a WinSock option is leveraged (SO_RCVTIMEO provided by Windows NT) that allows a blocked receive call to timeout if not used. The WinSock APIs 44 including select( ), accept( ), and recv( ) along with this option are described in more detail in the Windows Sockets specification version 2.0 and in "*Windows*™ *Sockets Network Programming*," B. Quinn and D. Shute, Addison-Wesley (1996).

Figure 3:
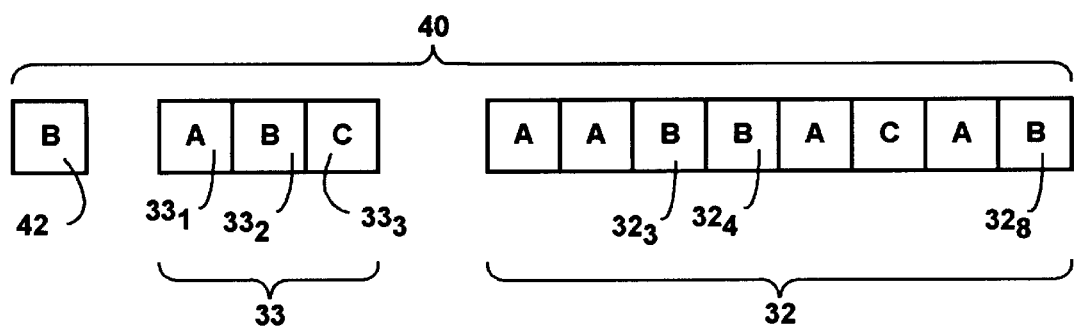
FIG. 3 is a block diagram representing an exemplary socket mask.

Conversely, existing receive-any data connections that are sufficiently active are migrated to receive-direct connections. The receive-any thread 36 performs this task based on activity on one or more of its data sockets 32 (FIG. 3). As described in more detail below, this allows the active connections to be receive-direct and the idle connections to be receive-any, which provides more-optimal overall performance while efficiently utilizing system resources.

Figure 5:
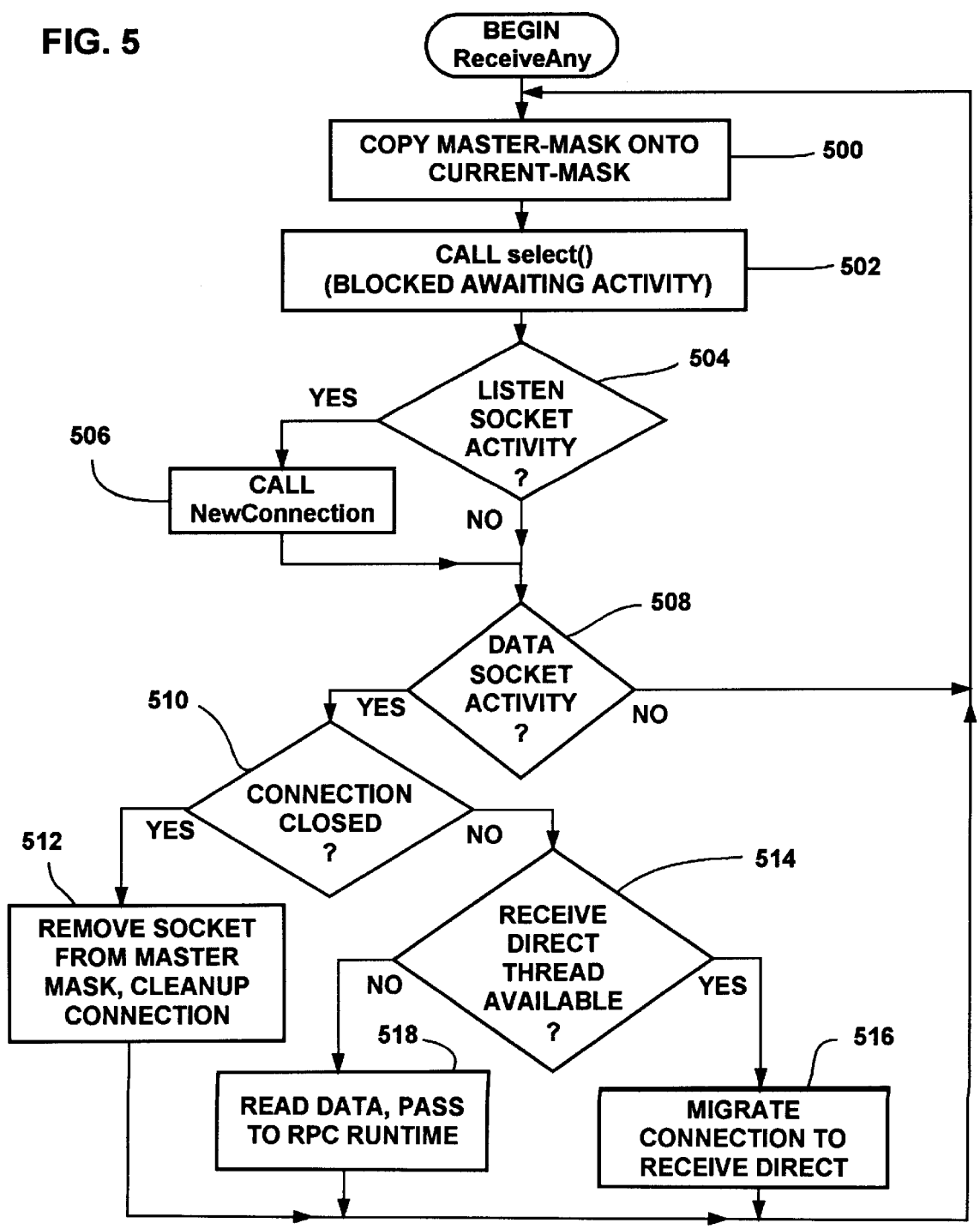
FIG. 5 is a flow diagram representing the general steps taken by a receive-any thread in accordance with one aspect of the present invention.

Turning to an explanation of the operation of the invention with particular reference to the flow diagrams of FIGS. 5–8, the receive-any (common listening) thread 36 is started when the first endpoint on a WinSock protocol is registered by the server $22_6$. As shown in FIG. 5, the common listening thread 36 loops forever, and first makes a copy of the socket mask 40, known as the master mask, onto a current mask 46 (FIG. 2) at step 500. At step 502, the common listening thread 36 calls one of the Winsock APIS 44, i.e., the selects API, passing the current mask 46 thereto. The common listening thread 36 is then blocked in the select using the current mask 46, waiting for activity on one of the sockets in the mask. Such activity includes requests for new connections on the mask's listening sockets and RPC requests on the data sockets.

Moreover, the (master) socket set 40 can change while the common listening thread 36 is blocked in select using the current mask 46. More particularly, a new listen socket may be added, (by RegisterEndpoint, described below), or a receive-direct connection may be migrated to a receive-any connection due to lack of activity, (by the ReceiveDirect thread, also described below). If the socket set 40 changes, the common listening thread 36 needs to wake up, update its current mask 46, and go back to the select with the updated current mask 46. To wake up the common listening thread 36, a synchronization socket 42 is provided in the socket mask 40. Writing (e.g., a byte) to the synchronization socket 42 unblocks the common listening thread 36. As evident from FIG. 5, once unblocked, the common listening thread 36 will eventually loop back to step 500 where the current-mask 46 will be updated. Step 502 will then call selects with the updated current mask 46.

In any event, one or more sockets can have activity when the select call is unblocked. Thus, the common listening thread 36 tests for listening socket and data socket activity whenever unblocked. As shown in FIG. 5, step 504 tests if a listen socket 33 has had activity, i.e., a new connection has been requested on an endpoint. If so, step 504 branches to step 506 where the NewConnection function 50 (FIG. 2, and described in more detail below with reference to FIG. 6) is called for the requested connection. Note that for purposes of simplicity FIG. 5 shows only one test for listen socket activity and only one potential call to NewConnection 50, although it is understood that steps 504–506 may be performed multiple times if multiple requests for new connections have been received in the same select. In any event, the request or requests for new connections, if any, are handled by steps 504–506, and the common listening thread 36 continues to step 508.

Step 508 of FIG. 5 tests if activity was detected on the data sockets 32. If not, the process branches back to step 500 where the current mask 46 is updated and select is again called as described above. However, if there is data socket activity, appropriate ones of the steps 510–518 are executed depending on the type of activity. Again, it is understood that multiple data sockets having activity during the same call to select( ) can be handled by repeating the steps 508–518 as appropriate for each data socket before returning to step 500.

Figure 4:
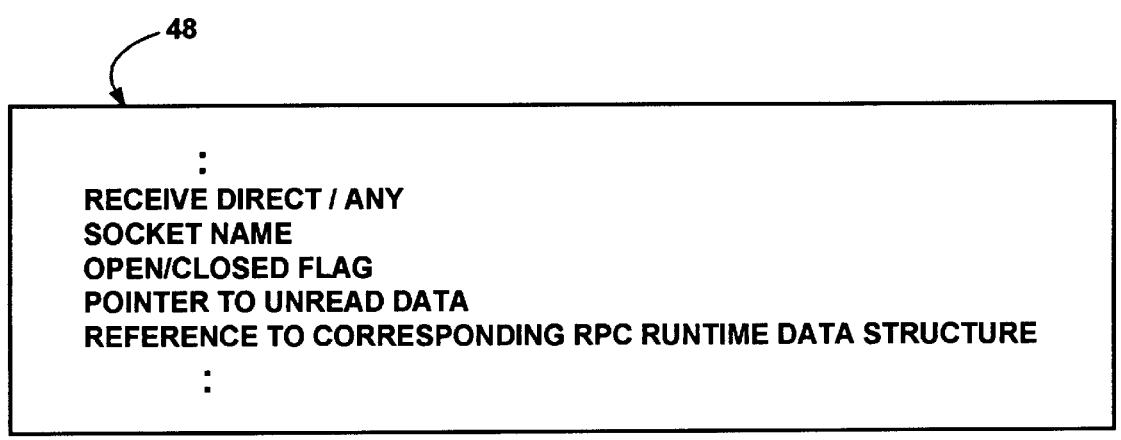
FIG. 4 is a block diagram representing an exemplary data structure for storing socket information.

Thus, upon detecting data socket activity, step 508 branches to step 510 where it is determined whether the activity resulted from a data socket's connection being closed. If so, step 510 branches to step 512 where that socket is removed from the master mask 40 and the receive-any connection cleaned up in a known manner. For example, an open/closed flag in the data structure corresponding to that socket (e.g., the connection object 48 of FIG. 4) is set to closed.

If instead the activity was a data request, step 510 branches to step 514 where the counter 39 or the like tracking the number of receive-direct threads is checked against the quota of receive-direct threads to determine if a receive-direct thread is available for this connection. At present, it is assumed that any data activity is sufficient to make the connection receive-direct if a receive-direct thread is available. However, in an alternative embodiment, a threshold test of the level of activity may also be performed before migrating a receive-any connection to receive-direct. For example, the first time a receive-any connection has data, the connection's socket information is associated with a timestamp, but the connection remains receive-any. If the next time that the connection has data activity minus the timestamp is less than a certain time duration, that connection will be made receive-direct. Note further that such a threshold test may be modified based upon the number of receive-direct threads available, i.e., if many receive-direct threads are available the threshold is lower (e.g., allowed time duration between activity is longer) than if few receive-direct threads are available.

In any event, if no receive-direct thread is available (or if the level of activity is below a threshold), step 514 branches to step 518 where the data is handled and passed to the RPC runtime 49. Conversely, if a receive-direct thread is available (and a threshold level of activity, if any, is met), the connection is migrated to receive-direct by branching from step 514 to step 516. The step of migrating includes signaling a ready thread (or if a ready thread is not available, creating the receive-direct thread, e.g., instantiating an object therefor), modifying the data structure (e.g., the connection object 48, FIG. 4) for that socket, including setting the appropriate receive-direct/any field therein to receive-direct status, and removing the data socket from the socket mask 40. For example, the socket pointer 323 (FIG. 3) may be the socket information that is removed from the master mask 40. The counter 39 is incremented, and, of course, the data is also handled. The receive-direct thread 38 is discussed in more detail below with reference to FIG. 7.

FIG. 6 represents the NewConnection function 50 which is called by step 506 of FIG. 5 in response to listen socket activity as described above. Step 600 of FIG. 6 calls the WinSock accept( ) API to obtain a new socket for the newly requested connection. Assuming that the accept is posted and the socket information is returned, (i.e., the client is allowed to connect and so on), step 602 tests the receive-direct thread counter 39 against the quota of receive-direct threads to determine if a receive-direct thread is available for this connection. At present, it is assumed that a new connection will have data activity, and thus if a receive-direct thread is available, the connection is made receive-direct by branching from step 602 to step 604. Step 604 creates the receive-direct thread, increments the receive-direct thread counter 39 and marks the connection as receive-direct in the corresponding socket data structure. If no thread is available, step 602 instead branches to step 606 where the connection is added to the master mask 40 as another one of the data sockets 32 (FIG. 3), and the data structure for that socket is also modified as necessary to make the connection receive-any. Again, it should be noted that if certain threshold levels of activity are desired before making a connection receive-direct, a new connection can directly be made receive-any, from where, as discussed above, the connection will be migrated to receive-direct if the connection thereafter meets the threshold requirements.

Figure 7:
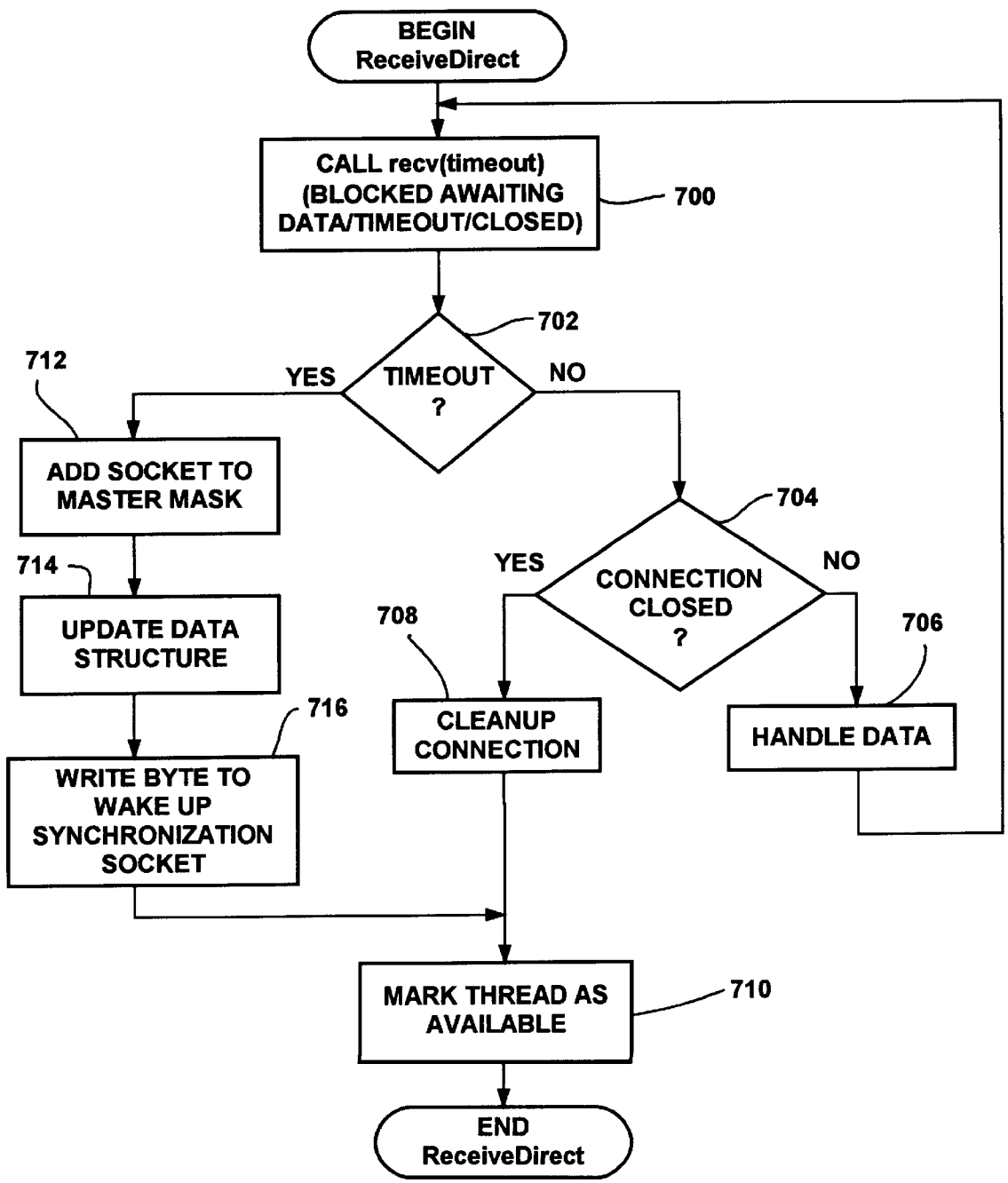
FIG. 7 is a flow diagram representing the general steps taken by a receive-direct thread in accordance with one aspect of the present invention.

FIG. 7 generally represents the steps taken by a receive-direct thread (such as the thread 38₁) to handle a receive-direct connection. Step 700 calls the WinSock recv( ) API, using the time-out socket option and passing a value (in milliseconds) as a time parameter. The passed time parameter is generally selected as a tradeoff between a desire to free idle receive-direct threads while avoiding overly-frequent migrations, and at present has been selected to time-out if no data activity is received on the socket for approximately thirteen minutes. Note that the time may be varied for a given socket based on the number of receive-direct threads available when the connection is made receive-direct, i.e., a longer time if many threads are available and a shorter time if few are available. Of course, the receive call will also unblock when the socket has some data activity, including activity to close the connection.

Once unblocked from receive, step 702 tests whether the call unblocked as a result of a lack-of-activity time-out. If not, there was activity, and step 702 branches to step 704 to test if the data activity resulted from closing the connection. If the activity was not to close the connection, but instead was a data request, the data (RPC request data) is handled, i.e., the recv( ) receives the data into application buffers as the data arrives, as represented by step 706.

However, if the activity was to close the connection, step 704 branches to step 708 where the connection is cleaned up in a known manner, e.g., the appropriate open/closed flag in the data structure 48 (FIG. 4) is marked as closed. At step 710, the receive-direct thread 38, is then marked as available by decrementing the counter 39 of receive-direct threads, and the receive-direct thread returns to the runtime where it is reclaimed. The receive-direct thread 38, then effectively ends.

In accordance with one aspect of the invention, in the situation where a receive-direct thread times out for lack of activity, step 702 branches to migrate the connection to receive-any. To accomplish the migration, step 712 adds the socket to the data sockets 32 in the master mask 40 (FIG. 3).

For example, the socket (pointer) 328 is added to the mask 40. Step 714 updates the appropriate one of the data structures 34 by setting the receive-direct/any field therein to receive-any. Then, at step 716, the receive-direct thread writes a byte to the synchronization socket 42 (FIG. 3), so that the receive-any thread 36 will unblock and update its current mask 46 with the new master mask 40 that reflects the receive-any status of the migrated data socket 328. The receive-direct thread 38, is then marked as available by decrementing the counter 39 of receive-direct threads (step 710). The receive-direct thread then returns to the runtime where it is reclaimed, and the receive-direct thread 38, effectively ends.

Lastly, whenever a new endpoint is registered on any of the WinSock protocols, the common listening thread needs to be made aware of and administer the added listening socket. To this end, a RegisterEndpoint function 54 is provided as generally described in the steps of FIG. 8. Step 800 represents the step of creating the new listen socket. As is known, the server creates a listen socket to listen for new connections on a predetermined protocol, and also sets up an endpoint at step 802 so clients can make the connection requests. Each such endpoint corresponds to one (or more) listening sockets which may belong to different protocols. In keeping with the invention, at step 804, the listen socket, e.g., socket 333 of FIG. 3 is added to the master mask 40. Lastly, the common listening thread 36 is made aware of the change at step 806 as a byte is written to the synchronization socket 42 to wake up the thread 36. As described above, writing the byte unblocks the common listening thread 36 from the select whereby the current mask 46 is updated with the changed master mask 40 before returning to the select.

The use of the socket mask 40 enables the receive-any (common listening) thread 36 to listen on virtually any protocol, including those not yet established. As long as the client as server are in agreement as to a particular protocol, they can communicate via a listening socket and then a data socket. The receive-any thread 36 detects the activity on the correct socket in the mask 40, and, as described above, handles the client request appropriately.

As can be seen from the foregoing detailed description, there is provided a method and mechanism for more efficiently using receive-any and receive-direct threads for handling connections. The method and mechanism adjusts thread usage for idle or active connections by migrating connections between receive-any and receive-direct based upon connection activity. The common receive-any thread that listens on multiple protocols.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of migrating a connection to a server between a receive-direct thread and a listening thread configured to listen for new connections, comprising:
   calling a function from the receive-direct thread, the function receiving data on the connection and timing out when the connection had no activity for a period of time;
   returning to the receive-direct thread from the function, the function providing information indicative of whether data was received or the connection had no activity; and
   migrating the connection to the listening thread when the information indicates the connection had no activity for a period of time.

2. The method of claim 1 wherein the connection is associated with a data socket in the server, and wherein migrating the connection to the listening thread includes adding information referencing the socket to a set of socket information associated with the listening thread.

3. The method of claim 1 wherein migrating the connection to the listening thread includes unblocking the listening thread.

4. The method of claim 1 wherein the server includes a plurality of other receive-direct threads and a counter tracks the receive-direct thread associated with the connection and the other receive-direct threads, and wherein migrating the connection to the listening thread includes modifying the counter to indicate that the connection is no longer associated with the receive-direct thread.

5. The method of claim 1 further comprising detecting data activity on a second connection to the listening thread, creating a second receive-direct thread, and migrating the second connection to the second receive-direct thread.

6. The method of claim 1 further comprising detecting data activity on a second connection to the listening thread, determining a level of data activity on the second connection, and if the level of activity on the second connection meets a threshold amount of activity, migrating the second connection to a second receive-direct thread.

7. The method of claim 1 further comprising detecting data activity on a second connection to the listening thread, determining if a receive-direct thread is available, and if a receive-direct thread is available, migrating the second connection to a second receive-direct thread.

8. The method of claim 1 further comprising detecting a request for a new connection on the listening thread, accepting the connection as an other connection, determining if at least one other receive-direct thread is available, and if at least one other receive-direct thread is available, migrating the second connection to the other receive-direct thread.

9. The method of claim 1 wherein the listening thread handles requests for new connections on at least one listening socket.

10. The method of claim 1 wherein the listening thread comprises a receive-any thread that handles requests for new connections on a plurality of listening sockets of different protocols.

11. The method of claim 1 wherein the listening thread and receive-direct thread receive remote procedure call data.

12. The method of claim 1 wherein the listening thread and receive-direct thread receive DCOM method call data.

13. A computer-readable medium having computer-executable instructions for performing the method of claim 1.

14. The method of claim 2 wherein the information referencing the data socket includes a pointer to a data structure, and adding information referencing the socket to a set of socket information includes adding the pointer to an array of pointers.

15. The method of claim 7 wherein the second connection is associated with a second data socket in the server, and wherein migrating the second connection to the second receive-direct thread includes removing information referencing the second data socket from a set of socket information associated with the listening thread.

16. The method of claim 7 wherein migrating the second connection to a second receive-direct thread includes creating the second receive-direct thread.

17. The method of claim 7 wherein determining if a receive-direct thread is available includes comparing a counter of receive-direct threads against a quota of receive-direct threads.

18. The method of claim 14 wherein migrating the connection to the listening thread includes modifying data in the data structure referenced by the pointer to indicate that the connection is associated with the listening thread.

19. The method of claim 15 wherein the information referencing the second data socket includes a pointer to a data structure, and wherein removing information referencing the second socket to a set of socket information includes removing the pointer from an array of pointers.

20. The method of claims 15 wherein the information referencing the second data socket includes a pointer to a data structure, and wherein migrating the connection to the second receive-direct thread includes modifying data in the data structure referenced by the pointer to indicate that the connection is associated with the second receive-direct thread.

21. In a computer system including a client socket connected via a virtual connection with a data socket of a server, a mechanism for handling the connection, comprising:
 a receive-direct thread associated with the data socket for handling communication on the connection;
 a listening thread configured to listen for new connections;
 a set of socket information associated with the listening thread;
 means for detecting when the connection has no activity for a period of time; and
 means for moving information referencing the data socket associated with the receive-direct thread to the set of socket information associated with the listening thread when the connection has no activity for a period of time.

22. The mechanism of claim 21 further comprising a data structure corresponding to the data socket, wherein the information referencing the data socket comprises a pointer to the data structure and the set of socket information comprises an array of pointers, and wherein the means for moving information referencing the socket includes means for adding the pointer to the array of pointers.

23. The mechanism of claim 21 further comprising means for unblocking the listening thread.

24. The mechanism of claim 21 wherein the server includes a plurality of other receive-direct threads and further comprising a counter of the receive-direct threads.

25. The mechanism of claim 21 wherein the listening thread includes means for detecting data activity on a second connection thereto, means for creating a second receive-direct thread in response to detecting data activity, and means for migrating the second connection to the second receive-direct thread.

26. The mechanism of claim 21 wherein the listening thread includes means for handling requests for new connections on at least one listening socket.

27. The mechanism of claim 21 wherein the listening thread comprises a receive-any thread that includes means for handling requests for new connections on a plurality of listening sockets of different protocols.

28. The mechanism of claim 21 wherein the listening thread and receive-direct thread receive remote procedure call data.

29. The mechanism of claim 21 wherein the listening thread and receive-direct thread receive DCOM method call data.

30. The mechanism of claim 22 further comprising means for modifying data in the data structure referenced by the pointer to indicate that the connection is associated with the listening thread.

31. The mechanism of claim 23 wherein the set of socket information includes a reference to a synchronization socket, and wherein the means for unblocking the listening thread includes means for writing information to the synchronization socket.

32. A method for handling a connection, comprising:
 providing a set of at least one listening thread, each listening thread configured to listen for new connections;
 providing a set of at least one receive-direct thread;
 migrating the connection from a first listening thread of the set thereof to a first receive-direct thread of the set thereof when a level of activity is achieved on the connection; and
 migrating the connection from the first receive-direct thread to one listening thread of the set thereof when a level of inactivity is achieved.

33. The method of claim 32 wherein migrating the connection from the first receive-direct thread to one listening thread of the set thereof when a level of inactivity is achieved includes blocking at the receive-direct thread until a period of time is achieved.

34. The method of claim 32 wherein migrating the connection from the first receive-direct thread to one listening thread of the set thereof includes migrating the connection from the first receive-direct thread back to the first listening thread.

35. The method of claim 32 wherein the set of at least one listening threads includes the first listening thread and at least one other thread, and wherein migrating the connection from the first receive-direct thread to one listening thread of the set thereof includes migrating the connection from the first receive-direct thread to another listening thread of the set thereof.

36. The method of claim 32 further comprising creating the connection at the first listening thread.

37. The method of claim 32 further comprising closing the connection.

38. A computer-readable medium having computer-executable instructions for performing the method of claim 32.

39. A method for handling a connection, comprising:
 providing a listening thread to listen for new connections and receive data on existing connections, the listening thread listening for requests for new connections on a plurality of different protocols;
 receiving data on a connection at the listening thread; and
 migrating the connection from the listening thread to a receive-direct thread such that further data on the connection is received for handling by the receive-direct thread.

40. The method of claim 39 further comprising, detecting at the receive-direct thread a level of inactivity on the connection, and in response to detecting the level of inactivity, migrating the connection from the receive-direct thread to the listening thread.

41. The method of claim 39 further comprising creating the connection at the first listening thread.

42. The method of claim 39 further comprising tracking to which thread the connection has been migrated.

43. A computer-readable medium having computer-executable instructions for performing the method of claim 39.

44. A system for handling data connections, comprising:

a listening thread configured to listen for new connections;

a receive-direct thread configured to handle data received from at least one of a plurality of connections, the listening thread migrating a first connection to the receive-direct thread to handle data received on the first connection;

a mechanism configured to detect activity on the first connection and to provide information to the receive-direct thread corresponding to a level of inactivity; and the receive-direct thread receiving the information corresponding to the level of inactivity from the mechanism, and in response, migrating the first connection to the listening thread.

45. The system of claim 44 wherein the receive-direct thread becomes available upon migrating the first connection to the listening thread, and wherein the listening thread migrates a second connection to the receive-direct thread to handle data received on the second connection when the receive direct thread is available.

46. The system of claim 44 wherein the receive-direct thread comprises a resource in a pool of receive-direct threads, and wherein a number representing available receive-direct threads in the pool is adjusted when the receive direct thread becomes available or is used.

47. The system of claim 44 wherein the mechanism configured to detect activity on the first connection and to provide information to the receive-direct thread corresponding to a level of inactivity comprises a blocking function, and wherein the blocking function wakes the receive-direct thread and indicates thereto whether the thread was awoken in response to activity or inactivity.

48. The system of claim 44 further comprising a synchronization socket for waking the listening thread when the receive-direct thread receives the information corresponding to the level of inactivity being achieved.

49. The system of claim 44 further comprising at least one data structure configured to track to which thread the connection has been migrated.

50. The system of claim 49 wherein at least one data structure comprises a socket mask.

\* \* \* \* \*